United States Patent Office 3,506,584
Patented Apr. 14, 1970

3,506,584
RARE EARTH CONTAINING CRYSTALLINE MATERIAL
Kalman M. Held, Jericho, N.Y., James G. Beckerley, Cohasset, Mass., and Henry B. W. Sadowski, Plainview, N.Y., assignors to Optical Materials, Inc., Plainview, N.Y., a corporation of New York
No Drawing. Filed July 14, 1966, Ser. No. 565,066
Int. Cl. C09k 1/06
U.S. Cl. 252—301.4
21 Claims

ABSTRACT OF THE DISCLOSURE

The invention provides a process for producing solid materials containing small amounts of rare earth element in the divalent state. A melt of a host material which solidifies and which is compatible with divalent rare earth elements in the solid state is established. A rare earth element in the trivalent state and halide salt selected from the group consisting of iodide and bromide salts of a metallic element component of the melt are added. The iodide or bromide salt then reduces the trivalent rare earth element to the divalent state while concomitantly oxidizing the halide ion to the elemental state. The invention also includes novel materials containing specified amounts of specified rare earth elements in the divalent state.

---

The present application is directed to processes for preparing a material containing rare earth element in the divalent state and to novel materials prepared by said processes.

Studies have indicated that the lanthanide series or rare earth elements having an atomic number of from 57 to 71 (hereinafter referred to as rare earth elements) have unusual ability to absorb radiant energy and to emit radiant energy of a coherent nature when a component of a suitable host. This characteristic is enhanced when the rare earth element is converted from other oxidation states to the divalent state. It has been found that the inclusion of divalent rare elements in single crystals produces materials suitable for use as lasers, masers, and for other purposes.

Although the theoretical advantage of including a rare earth element in the divalent state in a crystalline host material has been recognized, it has proven impossible, with few known exceptions, to produce such material. The known exceptions are disclosed in U. S. Patent Nos. 3,163,610 and 3,243,381. The life of these materials has been very short, with the rare earth element going to the trivalent state.

The difficulties encountered in producing stable divalent rare earth containing crystalline material has been attributed to the greater stability of the rare earth element in the trivalent state in the host materials utilized and under the conditions utilized. It has also been attributed to the strong oxidizing characteristics of many of the desirable host materials. Accordingly, there exists a need for processes for producing crystalline materials containing rare earth elements in the divalent state and particularly for such materials having satisfactory service characteristics.

It is an object of the present invention to provide processes for producing crystalline materials containing a rare earth element in the divalent state.

It is also an object of the present invention to provide novel crystalline material containing a rare earth element in the divalent state.

Crystalline materials containing small amounts of a rare earth element in the divalent state are produced by reducing the rare earth element from the trivalent state to the divalent state using an iodide or bromide salt. The use of the iodide salt is preferred. Crystalline materials are produced from a melt containing the components of the desired crystalline material, which is then solidified. The production of the rare earth element in the divalent state is preferably carried out while the material is molten. It may also be carried out by first preparing the solid crystalline material containing the rare earth element in the trivalent state and containing an iodide or bromide salt, and then reducing while in the solid state. This solid state reduction is limited to crystalline materials which may be prepared containing the rare earth element in the trivalent state.

For simplification, the reduction carried out utilizing bromide or iodide, is illustrated in terms of the preferred reductant, i.e., iodide. The preferred procedure comprises preparing a melt of the crystalline material containing the rare earth element in the trivalent state. The rare earth element is reduced to the divalent state by contact with iodide and the crystalline material containing the rare earth element in the divalent state is solidified. The iodine is preferably introduced to the melt in the form of a compound with the rare earth element, i.g., $DyI_3$ or in the form of a compound with one of the other components of the crystalline material, e.g., a compound with a component of the crystalline material, preferably an alkaline earth metal salt, e.g., $BaI_2$. The rare earth element referred to as "RE" in the equations is reduced in accordance with the following equation:

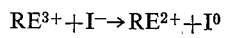

$$RE^{3+} + I^- \rightarrow RE^{2+} + I^0$$

When the iodine is introduced as a compound with the trivalent rare earth element, the equation becomes:

$$REI_3 \rightarrow REI_2 + I^0$$

When the iodine is introduced in the form of a compound with the rare earth, or with one of the other components of the melt, a preferred process utilizes thermal reduction based on the thermodynamics of the system, utilizing a temperature at which the rare earth element in the divalent state is formed. Alternative methods of reduction of the rare earth elements while the components of the crystalline material are molten, include photo-reduction, illumination of melt with ultraviolet, gamma radiation or electron beam bombardment, etc. The reduction may be carried out in vacuum, an inert atmosphere, or a reducing atmosphere. Crystalline materials containing small residual amounts of iodine are obtained by removing (pumping) the elemental iodine that is formed by the oxidation of iodide ion.

The reduction of the rare earth elements from the trivalent state may also be carried out by first producing solid crystalline material containing the trivalent rare earth elements and also containing iodide ion. The preferable reduction methods include solid state electrolysis, and solid state reduction by application of short wave energy such as gamma radiation, X-rays, electron beam, etc. The rare earth elements of greatest intersts are: samarium (Sm), dysprosium (Dy), thulium (Tm), holmium (Ho), and erbium (Er). The other rare earth elements may also be converted to the divalent state by the method of this invention.

The crystalline materials contain between about 0.0001 mole percent and 10 mole percent and preferably between 0.001% and 5 mole percent of the rare earth element, often referred to as a "dopant." The crystalline material which composes the great mass of the product is often referred to as the "host." The useful host materials are those which have less than true cubic symmetry. They have a net electric field. The desirable host materials are those which have good physical crystal properties and which have electric and chemical characteristics which are compatible with the desired use of the rare earth doped host. Illustrative crystalline materials include simple halide crystals such as calcium fluoride, magnesium fluoride sodium fluoride, etc. Among the physical requirements for a host is that it should be relatively non-fragile and non-hygroscopic. Iodide crystals and bromide crystals generally have poor physical properties; they are often hygroscopic. However, the iodine and/or bromine containing crystalline materials of the present invention function in a satisfactory manner. This is due to the removal of substantially all of the iodide or bromide by the oxidation of these ions to elemental form and subsequent volatilization.

The perovskites, a preferred host material, have the general formulae $ABF_3$, wherein A is an alkali metal, and B is an alkaline earth metal. Illustrative crystals of this class include $RbMgF_3$, $RbCaF_3$, $NaMgF_3$, $KMgF_3$, $KCaF_3$ and $KMgF_3 \cdot KCaF_3$. The halofluorides are also of particular interest as host crystals. These compounds have the general formula BXF, wherein X is selected from the group consisting of chlorine, bromine, and iodine; with chlorine being preferred; and B is at least one of barium, calcium and strontium. These compounds include BaFCl, BaFBr, CaFCl, and SrFCl. Mixed halofluorides such as $BaSrF_2Cl_2$ may also be used.

The process of the present invention provides crystalline material containing the rare earth element in the divalent state. The crystalline materials of most interest for use as lasers and masers, are in the form of single crystals. These single crystals may be grown from the melt utilizing the Bridgman-Stockbarger techniques involving slowly passing a crucible through a furnace having one zone wherein the temperature is maintained somewhat above the melting point of the crystalline material and another zone wherein the temperature is maintained somewhat below the melting point of the material. The Czochralski technique involves pulling a crystal from the melt, and is particularly applicable to the preparation of boules.

The preparation of the crystalline materials of this invention requires the use of pure materials. Care must be taken during processing to avoid reoxidation of the reduced rare earth ions. This will usually involve flushing of the system, and also often pretreatment of the melt with a reducing gas or a hydrogen halide to remove oxides and oxidizing materials. Materials used in the apparatus should be those which do not react with the melt components. As a general rule, precautions utilized in the production of these materials should be of the same nature as those used in producing very high grade pure single crystals for use in electronic components.

The invention is further explained to those skilled in the art in terms of the preparation of single crystals by the Bridgman-Stockbarger technique. A melt is formed of the host material, $RbMgF_3$. The melt is prepared at a temperature at about 940–950° C. and purified. Samarium is added in an amount of about 0.1 mole percent of the host material. The samarium ions and the iodide ions are preferably introduced in accordance with any of the following equations:

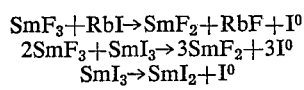

A hard vacuum is maintained in the system. The iodine that is formed by oxidation of the iodine ion, is pumped off. As is apparent from the foregoing equations, material produced in accordance with the first two equations will contain less residual iodine than will material produced in accordance with the third equation. The divalent samarium containing single crystal are produced from the melt in accordance with the Bridgman-Stockbarger technique as aforesaid.

Single crystals may also be produced from the halofluorides utilizing a melt prepared from BaClF at a temperature of about 1040–1050° C. The rare earth ions may be introduced as the trifluoride and the iodide introduced as the barium iodide. The rare earth ions may also be introduced as the triiodide.

Crystalline materials, preferably single crystals produced in accordance with the foregoing techniques have a high degree of crystallinity. They contain the rare earth element in the divalent form and are suitable for use as laser materials and as maser materials.

What is claimed is:

1. The process for producing solid emitting laser host materials containing small amounts of a rare earth element in the divalent state comprising establishing a melt of a host material which solidifies and which is compatible with divalent rare earth elements in the solid state, adding to said melt (i) a rare earth element in the trivalent state, (ii) a halide salt selected from the group consisting of iodide and bromide salts of a metallic element component of said melt, and allowing said iodide or bromide salt to reduce the trivalent rare earth element to the divalent state while concomitantly oxidizing the halide ion to the elemental state.

2. The process for producing solid materials containing between 0.0001 and 10 mole percent of a rare earth element in a divalent state comprising establishing a melt of a host material which solidifies and which is compatible with divalent rare earth elements in the solid state, said host material being selected from the group consisting of simple halide salts, perovskites, and halofluorides, adding to said melt (i) a rare earth element in the trivalent state, (ii) a halide salt selected from the group consisting of iodide and bromide salts of a metallic element component of said melt, and allowing said iodide or bromide salt to reduce the trivalent rare earth element to the divalent state while concomitantly oxidizing the halide ion to the elemental state.

3. The process of claim 2 wherein said rare earth element is selected from the group consisting of samarium, dysprosium, thulium, holmium and erbium.

4. The process of claim 3 wherein said rare earth (i) and said halide salt (ii) are both added to the melt in the form of the same rare earth trihalide; wherein said rare earth is reduced while the materials are molten; wherein said rare earth is in an amount between 0.001 and 5 mole percent, and wherein, after the reduction of said rare earth, said melt is solidified in the form of single crystals.

5. The process of claim 4 wherein said single crystals are a perovskite having the formula $ABF_3$ wherein A is an alkali metal ion, and B is an alkaline earth metal ion; and wherein said rare earth trihalide is an iodide.

6. The process of claim 5 wherein said perovskite is $RbMgF_3$ and said rare earth is samarium.

7. The process of claim 4 wherein said single crystals are a halofluoride having the formula BXF, wherein B is at least one alkaline earth metal selected from the group consisting of barium, calcium, and strontium, and wherein X is selected from the group consisting of chlorine, bromine, and iodine; and wherein said rare earth trihalide is an iodide.

8. The process of claim 2 wherein said halide salt (ii) is an alkaline earth metal iodide; wherein said rare earth is reduced while the materials are molten; wherein said rare earth is an amount between 0.001 and 5 mole percent; and wherein, after reduction of said rare earth, said melt is solidified in the form of single crystals.

9. The process of claim 8 wherein said single crystals are a perovskite having the formula $ABF_3$ wherein A is an alkali metal ion, and B is an alkaline earth metal ion; and wherein said alkline earth halide is an iodide.

10. The process of claim 9 wherein said perovskite is $RbMgF_3$; and wherein said rare earth is samarium.

11. The process of claim 8 wherein said crystalline material is a halofluoride having the formula BXF, wherein B is at least one alkaline earth metal selected from the group consisting of barium, calcium, and strontium; wherein X is selected from the group consisting of chlorine, bromine, and iodine; and wherein said alkaline earth halide is an iodide.

12. The process of claim 2 wherein said halide salt (ii) is an alkali metal iodide; wherein said rare earth is reduced while the materials are molten; wherein said rare earth is an amount between 0.001 and 5 mole percent; and wherein, after the reduction of said rare earth, said melt is solidified in the form of single crystals.

13. The process of claim 12, wherein said crystalline material is a perovskite having the formula $ABF_3$, wherein A is an alkali metal ion, and B is an alkaline earth metal ion; and wherein said alkaline earth halide is an iodide.

14. The process of claim 13 wherein said perovskite is $RbMgF_3$; and wherein said rare earth is samarium.

15. The process of claim 12 wherein said single crystals are a halofluoride having the formula BXF, wherein B is at least one alkaline earth metal selected from the group consisting of barium, calcium, and strontium; wherein X is selected from the group consisting of chlorine, bromine and iodine; and wherein said alkaline earth halide is an iodide.

16. The process of claim 1 wherein said material is compatible with rare earth elements in the trivalent state; and wherein said melt is first solidified to form a crystal and then allowing said iodide or bromide salt to reduce the trivalent rare earth to the divalent state; and wherein said rare earth element is in an amount of between about 0.0001 and 10 mole percent.

17. The process of claim 16 wherein said rare earth element is selected from the group consisting of samarium, dysprosium, thulium, holmium, and erbium, in an amount between 0.001 and 5 mole percent.

18. A luminescent perovskite crystalline material having the molar composition $ABF_3:yRE$, wherein A is an alkali metal, B is an alkaline earth metal, RE is a rare earth element in the divalent state selected from the group consisting of samarium, dysprosium, thulium, holmium, and erbium, and y is between 0.0001 and 10 mole percent.

19. The material of claim 18 wherein y is between 0.001 and 5 mole percent.

20. The material of claim 18 wherein $ABF_3$ is $RbMgF_3$.

21. The material of claim 18 wherein RE is samarium.

References Cited

UNITED STATES PATENTS

| | | | |
|---|---|---|---|
| 3,163,608 | 12/1964 | Yocom | 252—301.4 |
| 3,393,140 | 7/1968 | Fong | 252—301.4 |

OTHER REFERENCES

Kroger: Some Aspects of the Luminescence of Solids, 1948, pp. 290, 294, 295, and 296.

TOBIAS E. LEVOW, Primary Examiner

R. D. EDMONDS, Assistant Examiner